April 7, 1931. W. J. EDMONDS 1,799,359
WATER GAS PROCESS
Filed Dec. 24, 1926
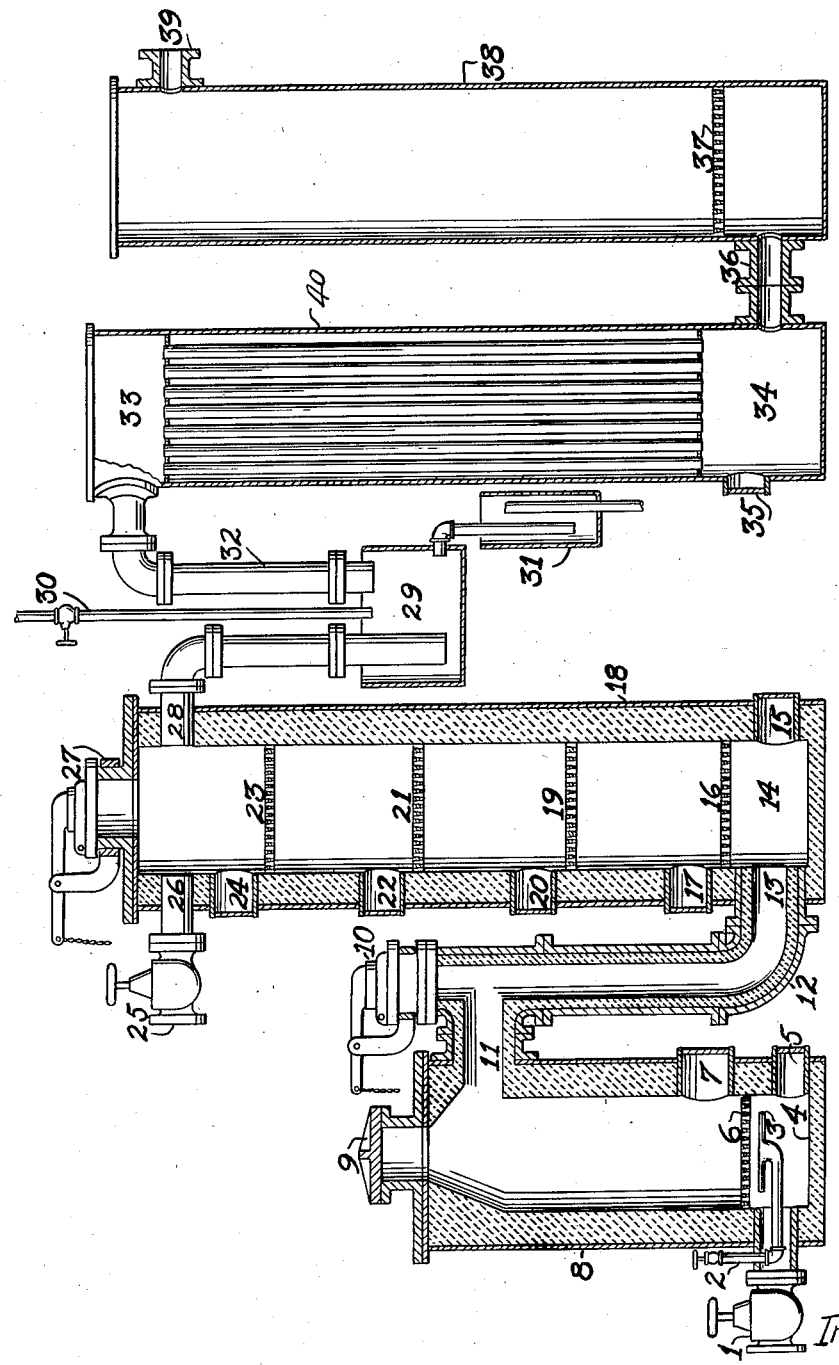
Inventor
William J. Edmonds
By Bruce K. Brown. Atty.

Patented Apr. 7, 1931 1,799,359

UNITED STATES PATENT OFFICE

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND

WATER-GAS PROCESS

Application filed December 24, 1926. Serial No. 156,862.

My invention pertains to the manufacture of water gas and relates more particularly to a process and apparatus for the production of pure water gas, free from sulfur compounds and from tar.

Water gas is produced by the action of steam on incandescent carbon, the fundamental chemical reactions involved being those expressed by the two following equations:—

(1) $2H_2O + C \rightleftarrows CO_2 + 2H_2$
(2) $H_2O + C \rightleftarrows CO + H_2$ At the usual temperatures of operation Equation (2) is the predominating reaction, and the gas thus produced has an average composition similar to the following:

Hydrogen _____ 51.5% by volume
Carbon monoxide _____ 41.0
Methane _____ 0.1
Carbon dioxide _____ 4.0
Nitrogen _____ 3.4

The presence of sulfur in the coke, coal, or other industrial carbon which forms the raw material for the production of water gas, causes the gas to become contaminated with various volatile sulfur compounds, particularly with hydrogen sulfide and with carbon disulfide. Prior to the utilization of water gas in various chemical and metallurgical processes it is necessary to remove these impurities. The removal of sulfur from various fuel gases, such as water gas, by contacting the material with iron or iron oxide is a procedure well known in the art. Processes employing iron oxide at normal temperatures as an agent to remove hydrogen sulfide from gases are known, and other processes have been developed employing iron or iron oxide at elevated temperatures for the removal of carbon disulfide as well as hydrogen sulfide.

In case metallic iron is employed as the purifying material, the desulfurization is believed to occur in conformity with the following reactions:—

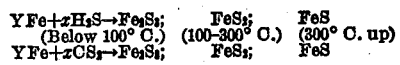
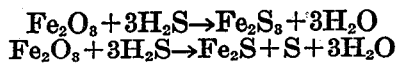

When iron oxide is used as the purifying material, the reactions are believed to occur as follows:

$$Fe_2O_3 + 3H_2S \rightarrow Fe_2S_3 + 3H_2O$$
$$Fe_2O_3 + 3H_2S \rightarrow Fe_2S + S + 3H_2O$$

and $$Fe_2O_3 + 4H \rightarrow Fe_2O + 2H_2O$$
$$Fe_2O + CS_2 \rightarrow 2FeS + CO$$

The present invention pertains to the rapid and economic utilization of the water gas reaction and the desulfurization reaction to produce pure water gas in a cyclic process; and relates, further, to suitable apparatus for this purpose. The invention may best be understood in conjunction with the accompanying drawing which displays the apparatus in vertical section with some parts shown in elevation.

In the drawing, 8 is a water gas generator, 18 a desulfurizing tower, 29 a water seal, 33 a condenser, and 38 a "tar scrubber" or trap filled with a suitable filtering material such as steel wool, which removes entrained tar globules, dust, and other solid materials from the gas.

The water gas generator 8 consists of a fire brick-lined steel shell in which carbon is brought to incandescence by combustion and is then contacted with steam to produce water gas. It is equipped with a supply port 9, a support grating 6, a cleaning door 7, and a dust pit 4 equipped with a cleaning door 5.

Steam is supplied to the generator by valve 2 through distributor 3. An air blast is supplied and controlled by valve 1. Near the top of the generator, an exit port 11, equipped with a stack valve 10, conveys the gas to a fire brick-lined steel pipe 12 which in turn supplies the gas to the desulfurizing tower 18, via port 13.

The desulfurizing tower 18, is a cylindrical fire brick-lined steel shell of about the same diameter as the generator 8, but of greater height. It is divided into a number of compartments by suitable iron grates 16, 19, 21, and 23, access to each compartment being provided by means of doors 15, 17, 20, 22, and 24. The grates 16, 19, 21, and 23 support porous layers of finely divided iron or iron oxide. Suitable forms of iron include steel wool, iron shavings, wire scrap, etc. If iron oxide is to be employed a suitable form is the dense granular oxide ($Fe_2O_3$). The tower 18 is connected with an air line shown by valve 25 which can be used to admit a blast of air to the tower via port 26. The desulfurizing tower 18 is equipped with a stack valve 27.

From the top of the tower the desulfurized gas is led through port 28 into water seal 29, which is supplied with water by line 30. The proper level of water is maintained in seal 29 by the constant-level device 31. After passing the water seal, the gas rises through pipe 32 into condenser 33. The gas passing downward through condenser 33 is cooled and most of the suspended tar particles and vapors are thus removed in the bottom section 34, which is equipped with door 35. The gas is conveyed from the condenser 33 through line 36 to scrubber 38. The gas rises through grating 37 and through the scrubber, which is filled with steel wool or some similar material to filter out any tar globules or dust which might remain suspended in the gas. The purified gas leaves the apparatus through port 39.

The apparatus thus described is operated by the following cyclic process.

Since the steps comprising the process are repeated at intervals, only one or two cycles of operation need be considered. For this purpose let it be assumed that the generator 8 is filled with incandescent coke, coal or other similar fuel. Steam is admitted through valve 2 and distributor 3, and on contacting with the incandescent fuel, water gas is formed. This gas passes through port 11, pipe 12, and port 13 into the bottom of desulfurizing tower 18. Dust will settle out in compartment 14 and the hot gas rising through gratings 16, 19, 21, and 23 is desulfurized by contact with the beds of iron or iron oxide on the gratings. The gases entering the bottom of the desulfurizer thru port 13 may range in temperature from 300°–650° C. depending upon the operating conditions; at the exit port 28, the temperature is generally in the neighborhood of 175°–450° C. The hot gases pass through port 28 into water seal 29 and thence to the condenser 33 where they are cooled and the major portion of the tar formed by the reaction is condensed and removed in bottom section 34. The gas from the condenser 33 then passes through the scrubber 38 and leaves the apparatus at port 39.

The production of water gas by the reaction of the steam with the incandescent fuel causes a reduction in the temperature of the latter substance which tends to stop the reaction. When the "steam blow" is completed, according to the prior art practice in water gas generation the steam is shut off at 2, the stack valve 10 is then opened, and the fuel is brought back to reaction temperature by means of rapid combustion induced by the air blast supplied from valve 1; the gaseous combustion products leaving the apparatus through stack valve 10. When the fuel is brought back to reaction temperature, as is indicated by the temperature of the exit gas, the air blow is cut off, the stack valve 10 is shut, and another "steam blow" producing more water gas is made.

The passage of the hot sulfur-laden water gas through the desulfurizing tower 18 and the consequent contacting of the gas with the finely divided iron or iron oxide causes the destruction of the volatile sulfur compounds by the formation of iron sulfide. This reaction occurs intermittently—i. e. each time water gas is passed through the desulfurizing tower. As the reaction at first takes place almost entirely on the outside of the iron or iron oxide particles, the desulfurizing action of the material is quickly diminished. The maintenance of this desulfurizing ability is one of the purposes of my invention.

To accomplish the production of a completely desulfurized water gas over a period of time, without any interruption of the process other than the intermittent character of operation required for the water gas reaction itself, it is necessary to periodically destroy the iron sulfide formed in the desulfurizing tower, so that fresh iron or iron oxide surfaces are always exposed to the water gas. I reduce the iron sulfide in situ by contacting it with oxygen and/or with carbon monoxide in the manner hereinafter described.

In average practice a water gas generator must be cleaned about once in eight hours. During this period I may regenerate the iron or iron oxide in the desulfurizing tower by destroying the iron sulfide formed during use. Air is admitted to the tower by valve 25 and port 26. It passes downward through the material on the gratings and rises upward through port 13, pipe 12, and stack valve 10. The air, on contacting with the iron sulfide in the tower, oxidizes the iron sulfide in accordance with the following equations:—

$$2Fe_2S_3 + 9O_2 \rightarrow 6SO_2 + 2Fe_2O_3$$
$$4FeS_2 + 11O_2 \rightarrow 8SO_2 + 2Fe_2O_3$$
$$4FeS + 7O_2 \rightarrow 4SO_2 + 2Fe_2O_3$$

The reaction is a highly exothermic one and the temperature should be controlled to lie within the range 300–700° C. This is accomplished by supplying the air blast at the proper space velocity. To bring up the materials to reaction temperature it is often advantageous to employ a mixture of steam and air rather than a dry air blast.

If iron oxide is the desulfurizing material to be employed in the process, revivification is thus completed. However, metallic iron is a slightly more active desulfurizing agent, and it is thus advantageous to employ metallic iron in the tower. To reduce the iron oxide, whether it is the material initially placed in the tower or the material formed by the destruction of iron sulfide by means of air, a gas containing carbon monoxide is employed, the reactions occurring as follows:

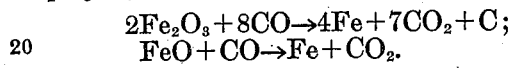
$$2Fe_2O_3 + 8CO \rightarrow 4Fe + 7CO_2 + C;$$
$$FeO + CO \rightarrow Fe + CO_2.$$

The products of the "air blow" from the generator, that is the gases resulting from the draft of air introduced through valve 1 into generator 8 to produce rapid combustion of the contained carbon or coke, contain a considerable proportion of carbon monoxide. To reduce the iron oxide in the desulfurizing tower 18, the products of the "air blow" from the generator 8, instead of being vented through stack valve 10 as in prior art practice, are conveyed through port 11, pipe 12, and port 13 into the bottom of the desulfurizing tower, whence it rises and is vented through stack valve 27. The contacting of this hot carbon monoxide-containing gas with the iron oxide causes the reduction of that material to metallic iron, which is then ready for further use in the desulfurization of water gas.

While iron oxide has practically the same desulfurizing ability as metallic iron, the use of the latter substance in the reaction is preferable since it is a more active desulfurizer and has more suitable physical properties for use in the process. Further, the superior results possible by the use of metallic iron are easily attained in my process by the employment of an otherwise waste material—that is the carbon-monoxide-containing "air blow" products as the reducing agent.

Furthermore in some cases it is possible to dispense entirely with the use of an air blast from line 25 and port 26 to revivify the iron sulfide. When air is first introduced into the burning coke in generator 8 at the commencement of an "air blow" a considerable portion of the contained oxygen passes through port 11 unchanged. Later, as the coke becomes hotter, practically all of the oxygen is reacted in passage to form carbon monoxide and carbon dioxide. Thus it is seen that the products of each air blow may be considered as composed of two parts— first a blast of hot gas containing free oxygen, and later a blast of hot gas containing little or no free oxygen but containing carbon monoxide. Advantage may be taken of this phenomenon, particularly when the fuel used for the generation of water gas contains but little sulfur.

In such cases it is possible to dispense with the use of an air blast from valve 25 for the conversion of the iron sulfide to iron oxide, this being accomplished solely by the hot gases comprising the products of first part of an "air blow". The products of the second part of the "air blow", being rich in carbon monoxide, satisfactorily accomplish the reduction of the formed iron oxide to metallic iron.

It is thus seen that my invention is capable of several different modes of operation. In every case the water gas is generated by the contacting of steam with incandescent carbon and is purified by contacting the hot gas thus formed with iron or iron oxide. In every case, also, the process is necessarily intermittent in operation since alternate "steam blows" and "air blows" are necessary to its continuance. The possible differences in mode of operation lie in the method of revivifying the iron or iron oxide employed as the desulfurizing agent.

As previously stated iron oxide itself is a suitable desulfurizing material and may be employed in my process and apparatus. When thus employed it desulfurizes the hot water gas contacted with it at the time of each steam blow. It is revivified by contact with the products of the air blow which is passed through it, venting through stack valve 27 when the present apparatus is employed. This action of the products of the air blow serves to convert the iron sulfide to iron oxide and also to reduce the iron oxide to iron.

While I prefer to operate the process and apparatus in such a manner that the products of every air blow are passed through the desulfurizing tower, this continuity of operation is not the essence of my invention. The invention may be practiced as well, in some cases, by venting some of the products of the air blows from the generator itself, through stack valve 10 in the present apparatus, and passing only occasionally the products of the air-blows through the sulfurizing tower, the number of air blows thus passed being determined by the exact conditions of operation and being numerous enough to assure the adequate revivification of the iron or iron oxide in the tower.

Similarly the blast of air or of air and steam, introduced in the present apparatus through valve 25 and port 26, may in some cases be dispensed with since the use of products of the air blows from the generator may alone be adequate to assure the complete revivification of the iron or iron oxide.

In general, when a low-sulfur fuel is employed for water gas generation, the periodic passing of air blows through the desulfurizing tower will be adequate to revivify the iron or iron oxide contained therein.

However, when great purity of water gas is required and high sulfur fuels are used, it may be advantageous to revivify the iron or iron oxide in the desulfurizing tower by use of the air or air and steam blast followed by the air blow products. While in the preferred embodiment of my invention the air blast is employed only at infrequent intervals and during a time when the process is shut down, and the air blow products are used intermittently during the operation of the process; it is within the spirit of my invention to employ the air blast at more frequent intervals if necessary. This may readily be done while the fuel bed in the generator is receiving an air blow, the generator and the desulfurizing tower both being vented through stack valve 10 of the present apparatus.

While I have distinguished clearly in the present specification between the phenomena involved in the use of iron and of iron oxide as the desulfurizing material, it is obvious that in the practical operation of the process and apparatus these two substances may be grouped together as "desulfurizing material". Even if the desulfurizing material originally employed is metallic iron, there will be a varying oxidation and reduction during the operation of the process, so that some iron oxide will always be present. Similarly, if the desulfurizing material originally employed is iron oxide, the frequent treatments of the formed sulfides with carbon monoxide gas in the products of the "air blow" will assure the presence of some metallic iron during use.

While I prefer to employ iron or iron containing material as the desulfurizing material in my process and apparatus it is well known that other metals, notably copper, will function in the same manner. Finely divided copper may be employed in the present process and apparatus without departing from the spirit of my invention.

While, as has previously been indicated, my process may be satisfactorily carried out in several ways, the following specific example will illustrate a preferred modification. The generator is charged up to a level of about 7' above the grate, with the stack valve open. The blower is started and the air valve opened. The air burns in a zone near the grates which becomes intensely hot. As this zone extends part of the $CO_2$ is reduced to CO, while the upper layer of coke is being preheated by the hot gases. As the blow proceeds the proportion of CO in the exit gases rises, and the gases will flash with flame. The temperature of these exit gases may reach 650°–750° C. before the air is cut off.

Steam is now blown in below the grate. At it passes up thru the grate it is converted to water gas, absorbing heat from the bed of hot incandescent coke. The zone of reaction will rise from the bottom towards the top of the generator, and as the time of contact is decreased and the temperature falls off, the decomposition of steam decreases. The carbon dioxide in the water gas increases as decomposition decreases. The length of the steam run may vary from 4 to 10 minutes depending upon the composition desired and rate of gasification. The cycle, air blow (4–6 minutes), steam run (4–10 minutes) is repeated regularly for periods ranging from 45 minutes to 3 hours. On passing the gases thru the desulphurizer their sulphur content is reduced to about .7 grain per 100 cubic feet of gases when the temperature of the gases at the entrance of the desulfurizer is 400°–600° C. and at the exit about 250°–450° C.

The sulfur is then removed from the iron by passing oxygen or air over the iron sulfide. This may be done by passing air into the desulfurizer thru line 25 and port 26, but in some cases it is found possible to dispense with this source of oxygen. When air is first introduced into the burning coke in generator 8, after a clean out and when the fuel bed has cooled off a considerable portion of the oxygen passes thru 11 unchanged. Later as the coke becomes hotter all of the oxygen is reacted in passage to form carbon dioxide and is subsequently reduced in part to carbon monoxide. Thus, there will be supplied first oxygen for the oxidation reaction and second carbon monoxide for the reduction of iron oxide to iron. It has been found that these gases cause an efficient regeneration of the iron when the sulfur content of the fuel used for the generation of water gas contains but little sulfur and that for periods of 2 to 3 months no regeneration is required other than that produced by the combustion gases passed thru the desulfurizer after cleaning out the generator.

In résumé the distinction between the terms "air blow" and "air blast" will again be made. The "air blow" is the draft of air forced into the generator to bring the fuel to incandescence. The gaseous products of this air blow, containing at first a considerable proportion of oxygen and later a considerable proportion of carbon monoxide, are used to revivify the desulphurizing material in the present invention. In the present apparatus it is formed in the generator 8 and is vented through stack valve 10, or used in the desulfurizing tower 18, in which case it is vented through stack valve 27. The "air blast" is the air introduced in the desulfurizing tower to oxidize the formed iron sulfides to iron oxide. It may be admixed with steam. In the present apparatus it is introduced through valve 25 and port 26 into the top of desulfurizing tower 18. It passes downward through the tower, up through pipe 12, and is vented through stack valve 10.

Now, having fully described my invention, I claim the following as new and novel:—

1. A cyclic process for the production of substantially sulphur-free water gas, which comprises subjecting fuel to alternate air and steam blows, desulphurizing the water gas resulting from the steam blows by contacting said gas with a solid desulphurizing material, and revivifying the desulphurizing material at intervals, during air blows, by contacting said material with gases comprising, at least in part, the gaseous products of said air blows.

2. A cyclic process for the production of substantially sulphur-free water gas, which comprises subjecting a mass of fuel to alternate air and steam blows, desulphurizing the water gas resulting from the steam blows by contacting said gas with a solid desulphurizing material, replacing the fuel when spent, bringing the fresh fuel to incandescence by means of an air blow, and revivifying the desulphurizing material during the first air blow of the fresh fuel by contacting said material with gases comprising, at least in part, the gaseous products of said air blow.

3. In a cyclic process for the production of substantially sulphur-free water gas in which a mass of fuel is subjected to alternate air and steam blows, the water gas resulting from the steam blows being desulphurized by contact with a solid desulphurizing material, the step which comprises revivifying the desulphurizing material during an air blow by contacting said material with gases comprising, at least in part, gaseous products from said air blow.

4. In a cyclic process for the production of substantially sulphur free water gas in which a mass of fuel is brought to incandescence by means of an air blow and is then subjected to alternate steam and air blows, the water gas resulting from the steam blows being desulphurized by contact with a solid desulphurizing material, the step which comprises revivifying the desulphurizing material, which was spent in a previous run, by contacting said material with gases comprising, at least in part, the gaseous products of the first air blow to which the fresh mass of fuel is subjected.

5. A cyclic process for the production of substantially sulphur-free water gas, which comprises subjecting fuel to alternate air and steam blows, desulphurizing the water gas resulting from the steam blows by contacting said gas with metallic iron, and revivifying the iron at intervals, during air blows, by contacting said iron with gases comprising, at least in part, the gaseous products of said air blows.

6. A cyclic process for the production of substantially sulphur-free water gas, which comprises subjecting a mass of fuel to alternate air and steam blows, desulphurizing the water gas resulting from the steam blows by contacting said gas with metallic iron, replacing the fuel when spent, bringing the fresh fuel to incandescence by means of an air blow, and revivifying the iron during the first air blow of the fresh fuel by contacting said iron with gases comprising, at least in part, the gaseous products of said air blow.

7. In a cyclic process for the production of substantially sulphur-free water gas in which a mass of fuel is subjected to alternate air and steam blows, the water gas resulting from the steam blows being desulphurized by contact with metallic iron, the step which comprises revivifying the iron during an air blow by contacting said iron with gases comprising, at least in part, gaseous products from said air blow.

8. In a cyclic process for the production of substantially sulphur-free water gas in which a mass of fuel is brought to incandescence by means of an air blow and is then subjected to alternate steam and air blows, the water gas resulting from the steam blows being desulphurized by contact with metallic iron, the step which comprises revivifying the iron, which was spent in a previous run, by contacting said iron with gases comprising, at least in part, the gaseous products of the first air blow to which the fresh mass of fuel is subjected.

9. A cyclic process for the production of substantially sulphur-free water gas, which comprises subjecting fuel to alternate air and steam blows, desulphurizing the water gas resulting from the steam blows by contacting said gas with iron oxide, and revivifying the iron oxide at intervals, during air blows, by contacting said iron oxide with gases comprising, at least in part, the gaseous products of said air blows.

10. A cyclic process for the production of substantially sulphur-free water gas, which comprises subjecting a mass of fuel to alternate air and steam blows, desulphurizing the water gas resulting from the steam blows by contacting said gas with iron oxide, replacing the fuel when spent, bringing the fresh fuel to incandescence by means of an air blow, and revivifying the iron oxide during the first air blow of the fresh fuel by contacting said iron oxide with gases comprising, at least in part, the gaseous products of said air blow.

11. In a cyclic process for the production of substantially sulphur-free water gas in which a mass of fuel is subjected to alternate air and steam blows, the water gas resulting from the steam blows being desulphurized by contact with iron oxide, the step which comprises revivifying the iron oxide during an air blow by contacting said iron oxide with gases comprising, at least in part, gaseous products from said air blows.

12. In a cyclic process for the production of substantially sulphur free water gas in which a mass of fuel is brought to incandescence by means of an air blow and is then subjected to alternate steam and air blows, the water gas resulting from the steam blows being desulphurized by contact with iron oxide, the step which comprises revivifying the iron oxide which was spent in a previous run, by contacting said iron oxide with gases comprising, at least in part, the gaseous products of the first air blow to which the fresh mass of fuel is subjected.

In testimony whereof I affix my signature.

WILLIAM J. EDMONDS.